US010574699B1

(12) United States Patent
Baer et al.

(10) Patent No.: US 10,574,699 B1
(45) Date of Patent: Feb. 25, 2020

(54) LOAD BALANCER REQUEST PROCESSING

(71) Applicant: Amazon Technologies, Inc., Seattle, WA (US)

(72) Inventors: Graeme David Baer, Seattle, WA (US); Bradford Taylor Lyman, Seattle, WA (US); Weixun Wang, Sammamish, WA (US); Dmitry Frenkel, Bothell, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 572 days.

(21) Appl. No.: 14/954,787

(22) Filed: Nov. 30, 2015

(51) Int. Cl.
*H04L 29/06* (2006.01)
*H04L 29/08* (2006.01)
*G06F 21/62* (2013.01)

(52) U.S. Cl.
CPC .......... *H04L 63/20* (2013.01); *G06F 21/6218* (2013.01); *H04L 63/08* (2013.01); *H04L 63/12* (2013.01); *H04L 67/1002* (2013.01)

(58) Field of Classification Search
CPC ................... H04L 67/1002; G06F 21/6218
See application file for complete search history.

(56) References Cited

U.S. PATENT DOCUMENTS

| 8,230,419 | B2* | 7/2012 | Bulson | G06F 9/5044 |
| | | | | 718/1 |
| 8,832,215 | B2* | 9/2014 | Patel | G06F 9/505 |
| | | | | 709/201 |
| 9,389,898 | B2* | 7/2016 | Barak | G06F 9/45558 |
| 2007/0112772 | A1* | 5/2007 | Morgan | G06F 21/53 |
| 2007/0250833 | A1* | 10/2007 | Araujo, Jr. | G06F 21/6218 |
| | | | | 718/1 |
| 2010/0131654 | A1* | 5/2010 | Malakapalli | H04L 67/08 |
| | | | | 709/227 |
| 2010/0306765 | A1* | 12/2010 | DeHaan | G06F 9/541 |
| | | | | 718/1 |
| 2013/0054809 | A1* | 2/2013 | Urmanov | G06F 9/505 |
| | | | | 709/226 |
| 2014/0280499 | A1* | 9/2014 | Basavaiah | H04L 67/1002 |
| | | | | 709/203 |
| 2018/0241809 | A1* | 8/2018 | Gandhi | H04L 67/1008 |

* cited by examiner

*Primary Examiner* — Mohammed Waliullah
(74) *Attorney, Agent, or Firm* — Davis Wright Tremaine LLP

(57) ABSTRACT

A load balancing service receives a request from a customer to configure a load balancer for distributing incoming requests to one or more computing resources of the customer. The load balancing service uses configuration information specified in the request to configure the load balancer such that the load balancer, in response to an incoming request, can determine whether the incoming request satisfies a set of request processing rules usable to determine whether the request is to be transmitted to any computing resource of the one or more computing resources. The load balancer transmits the incoming request to a computing resource of the customer as a result of the rules being satisfied.

20 Claims, 9 Drawing Sheets

LOAD BALANCER REQUEST PROCESSING

BACKGROUND

Customers and other users of a computing resource service provider often configure load balancers to distribute incoming network traffic across multiple computing resources or services maintained by the computing resource service provider. For instance, a customer of the computing resource service provider can configure a load balancer to ensure that network traffic is routed to only active computing resources, which may prevent network traffic from being transmitted and delivered to offline or otherwise inactive computing resources. However, customers and other users of the computing resource service provider may want to ensure that any incoming network traffic is authenticated and that any users attempting to access the customer's services or computing resources are authorized to do so prior to delivery of any incoming network traffic to these services or computing resources.

BRIEF DESCRIPTION OF THE DRAWINGS

Various techniques will be described with reference to the drawings, in which.

DETAILED DESCRIPTION

Figure 1:
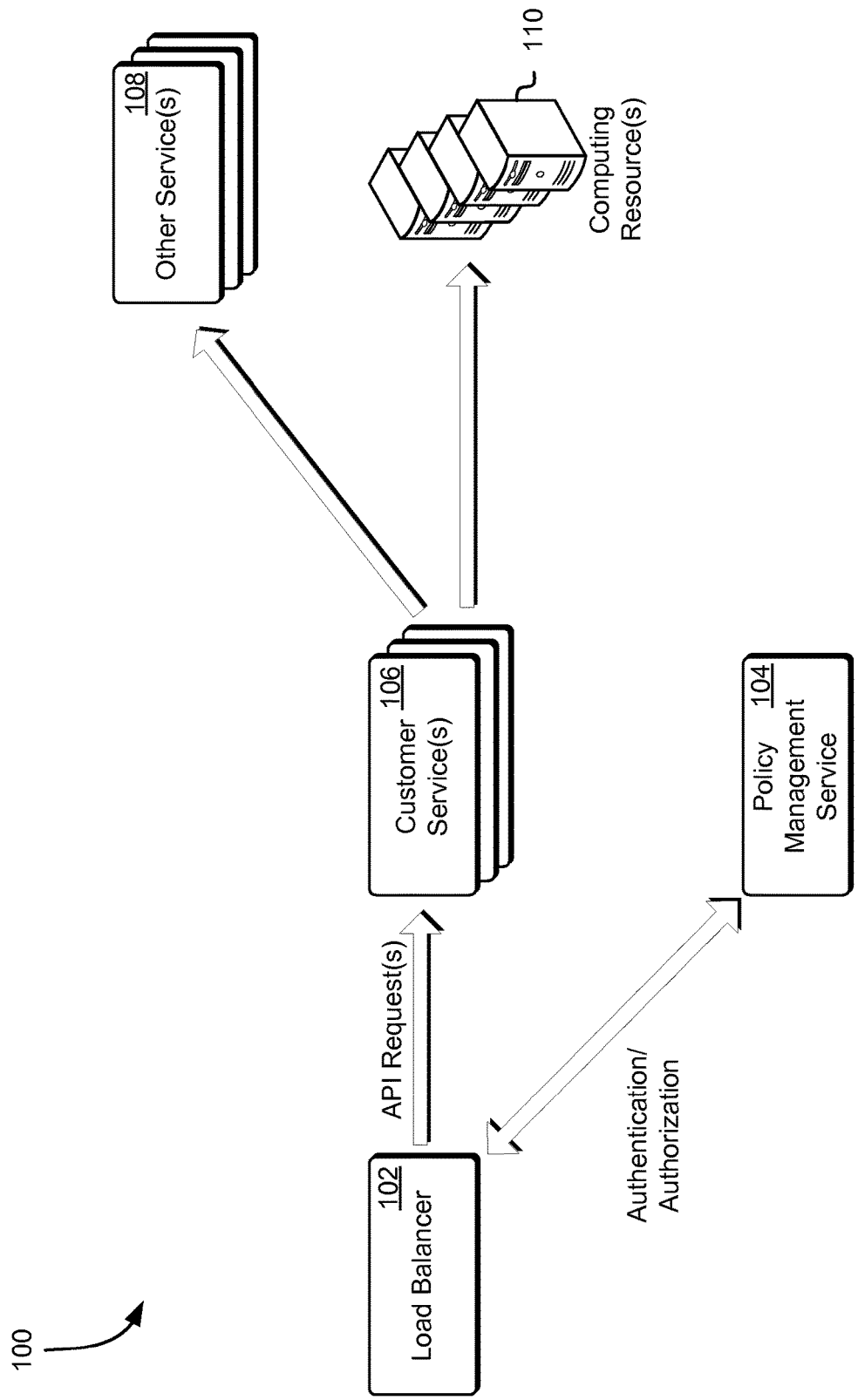
FIG. 1 shows an illustrative example of an environment in which various embodiments can be implemented.

This disclosure relates to the provisioning and use of a load balancer for a customer's services and computing resources to monitor incoming requests to determine whether a user making the requests can be authenticated and is authorized to make any requests prior to providing any of these requests to the targeted services and computing resources. In some examples, a customer of a computing resource service provider transmits a request to a load balancing service to configure a load balance for a customer service operating through use of a variety of computing resources managed by the computing resource service provider. The customer may specify a variety of policies that may apply to the customer service. For instance, a customer may specify that only certain users are authorized to submit requests to the customer service. Further, the customer may specify that users having authentic credentials usable to access the customer service or the computing resource service provider may transmit requests to the customer service. The requests transmittable to the customer service may further be governed through use of these policies. The load balancing service may transmit the specified policies to a policy management service where they may be accessed by the load balancer. Additionally, the load balancing service may obtain a virtual machine image from a load balancer data store corresponding to the customer's request and specifications to configure the load balancer for the customer service and its associated computing resources.

In an example, the load balancer activated in response to the customer request, receives incoming requests from users of the customer service and its associated computing resources to access or otherwise perform any number of operations using the customer service. In response to a received user request, the load balancer may transmit the request to the policy management service to determine whether a signature included with the request is authentic. For instance, the request may include a set of credentials for the user or a digital signature that may be verified by the policy management service. If the user making the request is authenticated by the policy management service, the load balancer may identify, from the policy management service, a number of policies associated with the customer service and the user making the request. The load balancer may determine whether it has the necessary policies to determine whether the user is authorized to make the request to the customer service and may obtain any necessary policies from the policy management service that are not stored in the load balancer's cache. The load balancer may evaluate the applicable policies and determine whether the user is authorized to make the incoming request to the customer service. If so, the load balancer may transmit the request to the customer service for further processing. However, if any policy specifies that the user is not authorized to provide such a request, the load balancer may deny the user's request without transmitting the request to the customer service.

In some examples, a customer of the computing resource service provider can configure the load balancer to collect metering data for various users based on the requests received by the load balancer. For instance, a customer can specify in its request to configure a load balancer that the load balancer is to identify the type of request being received from users of the customer service and collect data with regards to the request (e.g., request fulfillment, any error messages associated with request failures, etc.) that may be used for billing these users. Further, a customer may specify whether any metering data obtained by the load balancer is to be provided to the customer, batched per user over a period of time, or provided to a metering service for processing. In some examples, the computing resource service provider can provide incentives for different methods of aggregating metering data. For instance, in response to processing user requests, the computing resource service provider may obtain a portion of a fee for each successfully processed request from a user. For example, if a customer charges a fee to process a particular request using its service, the computing resource service provider may obtain a portion of the fee based on the computing resources provisioned by the customer to support its service. The computing resource service provider may provide incentives to customers (e.g., reduced fee portions) that opt to batch the metering data and utilize the metering service to process the data. This may enable the customer to make a choice as to how the load balancer is to process user metering data for user billing purposes.

In this manner, a customer of a computing resource service provider can provision and configure a load balancer for any of its services and associated computing resources to monitor any incoming user requests and determine whether these user requests should be delivered to the customer's services and associated computing resources. In addition, the techniques described and suggested herein facilitate additional technical advantages. For instance, because the load balancer is configured to perform authentication and authorization checks prior to transmitting any user request to a target customer service or computing resource, unauthorized requests or requests being made by unauthenticated users may be denied prior to reaching the customer service, thereby reducing the processing time for these customer services to process authorized requests for authenticated users. This, in turn, may improve the performance of the customer service as more processing capacity may be used to process these requests.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a load balancer 102 may monitor and analyze any incoming application programming interface (API) requests from various users directed towards one or more customer services 106 maintained by a computing resource service provider on behalf of a customer. The load balancer 102 may be a computer system or virtual computer system configured to distribute incoming API requests to one or more customer services 106, which may include one or more virtual computer instances supported by physical hosts or other computing resources, in order to optimize resource utilization and/or avoid overloading a particular customer service 106 or computing resource. For example, the load balancer 102 may be implemented using physical hardware connected to a server rack or otherwise included in a data center. In another example, the load balancer 102 may include one or more virtual machines supported by a particular physical host operated by the computing resource service provider. The load balancer 102 may be managed through a load balancing service of a computing resource service provider and may utilize physical hardware implemented by the computing resource service provider. In such embodiments, to change the configuration of the load balancer 102, a customer may be required to submit a request to the load balancing service to promulgate these configuration changes.

In some embodiments, a customer of the computing resource service provider transmits a request to a load balancing service to provision a load balancer 102 for one or more customer services 106 and/or associated computing resources maintained by the computing resource service provider. The request to the load balancing service may specify the one or more customer services 106 and/or computing resources for which the load balancer 102 is to monitor and distribute incoming network traffic and requests. For instance, the customer may specify, through an interface (e.g., graphical user interface (GUI)) of the load balancing service, the one or more customer services 106 and/or computing resources to which the load balancer 102 is to be associated with. Alternatively, if the request to the load balancing service is an API call to the service to provision the load balancer 102, the API call may specify one or more identifiers for the customer services 106 and/or computing resources for which network traffic is to be monitored by the load balancer 102.

The request to the load balancing service may further specify one or more preferences for the monitoring of incoming API requests destined for the customer services 106. For instance, a customer of the computing resource service provider may specify one or more policies that may define a level of access for one or more users of the customer services 106, as well as identifiers for users permitted to transmit requests to the customer services 106. The customer of the computing resource service provider may require users of the one or more customer services 106 to provide a set of credentials that may be authenticated through a policy management service 104 of the computing resource service provider. Alternatively, the customer may provide, within the request to provision the load balancer 102, configuration information for the load balancer that may include executable instructions for authenticating users of the customer services 106. For instance, the customer may specify, for each user of the customer services 106, a cryptographic key that may be used by a user to digitally sign their API requests to the customer services 106. The load balancer may be configured to verify authenticate any incoming API requests by verifying the digital signature of the request through use of the user's specific cryptographic key. In an alternative embodiment, the load balancing service is provided with configuration information for the load balancer 102 that includes a universal cryptographic key that can be used to verify digital signatures of all users of the customer services 106. For instance, a customer of the computing resource service provider may generate distinct cryptographic keys for its users by using each user's identifier and the universal cryptographic key to generate the user's specific cryptographic key. The user's specific cryptographic key may be provided to the user to generate digital signatures for its API requests. Thus, in response to the load balancer 102 obtaining an API request from a user, the load balancer 102 may obtain the digital signature from the request and utilize the universal cryptographic key and the user identifier to determine whether the digital signature is authentic.

In some embodiments, the configuration information specifies one or more request processing rules that may be utilized to determine whether any incoming API requests may be processed. For instance, the request processing rules may specify that the API request may be transmitted to the customer services 106 only if the API request can be authenticated and the user submitting the API request is authorized to perform the one or more operations specified in the request. As another example, the request processing rules may specify that API requests from users associated with the customer account may be passed through to the customer services 106 without need for performing additional authentication or authorization analyses. Alternatively, any API requests from users not associated with the customer account may be required to be evaluated to determine whether they are authentic and the users are authorized to perform the operations specified in the API request. In some instances, the request processing rules may specify whether the load balancer 102 is to determine metering data from incoming API requests, which may be batched and either provided to the customer or to a metering service for processing and billing of users utilizing the customer services 106.

The one or more policies may further specify whether a particular user is authorized to transmit certain API requests to the customer services 106. For instance, a particular user of the one or more customer services 106 may only be permitted to perform read operations using the one or more customer services 106. Thus, an API request specifying any operations other than read operations may be denied by the load balancer 102 based at least in part on an evaluation of the one or more policies applicable to this particular user. The one or more policies may further define whether the load balancer 102 is accessible only to users within the customer's own computing resource service provider account or from any account. Thus, private API requests (e.g., stemming from the customer's account) may be transmitted to the customer services 106 while public API requests (e.g., stemming from a different account) may be subject to greater scrutiny, whereby additional policies may be used to determine whether the API request is to be transmitted to the customer services 106 or denied.

Based at least in part on the customer's preferences, the provided policies for users of the customer services 106, and any configuration information provided by the customer, the load balancing service may configure the load balancer for the identified customer services 106 and computing resources. For instance, the load balancing service may obtain a virtual machine image for the load balancer from the load balancer repository based at least in part on the customer's preferences. This virtual machine image may be instantiated onto a physical host (e.g., computer system) of a virtual computer system service, whereby the load balancing service may transmit one or more configuration files to the load balancer to configure the load balancer per the customer's preferences. Further, the load balancing service may configure the load balancer to monitor for any incoming API requests directed towards the customer services 106. For instance, the load balancing service may configure the load balancer 106 to monitor for specific Internet Protocol (IP) addresses corresponding to the one or more customer services 106 and perform any authentication/authorization checks prior to transmitting any API requests to the customer services 106. The load balancing service may activate the load balancer once it has been configured according to the customer's preferences.

In response to an incoming API request from a user attempting to access the one or more customer services 106, the load balancer 102 may transmit the request to the policy management service 104 to determine whether the API request can be authenticated. For instance, as described above, the API request may be digitally signed using the user's set of credentials for the computing resource service provider. The policy management service 104 may verify the digital signature by hashing the user's known set of credentials and the request itself. If the result of this hashing differs from the provided digital signature, the request may not be authenticated by the policy management service 104. This may result in the load balancer 102 denying the API request from user. For instance, the load balancer may return, to the user, a 400-series HyperText Transfer Protocol (HTTP) error to indicate that the request could not be processed. If the request is successfully authenticated, the policy management service 104 may transmit a notification indicating the successful authentication of the request, as well as identifiers for any policies that are applicable to the identified user, the account of the user, and the customer services 106 themselves.

In an embodiment, the load balancer 102 includes a policy cache, which is used to store any user and/or account policies previously obtained from the policy management service 104 in response to received API requests from users. The load balancer 102 may evaluate the notification from the policy management service 104 and determine whether any of the specified policies are not stored within the policy cache. If there are any policies that are not stored within this policy cache, the load balancer may transmit a request to the policy management service 104 to obtain the applicable policies from the policy management service 104. The load balancer 104 may evaluate the identified policies specified by the policy management service 104 to determine whether the user that submitted the incoming API request is authorized to make such a request to the customer services 106. For instance, the load balancer 102 may evaluate the API request to determine what kind of request is being made (e.g., read, write, modify, delete, etc.). The load balancer 102 may evaluate the one or more applicable policies to determine whether any of these policies explicitly prohibit the user from requesting performance of any of the operations specified in the API request. If so, the load balancer 102 may deny the API request.

If the load balancer 102 determines that the user is authorized to request performance of the specified operations in the API request or if there is no policy prohibiting performance of these specified operations, the load balancer 102 may transmit the API request to the one or more customer services 106. The one or more customer services 106 may be used for various purposes, such as to operate as servers supporting a website, to operate business applications, or generally, to serve as computing power for the customer. The one or more customer services 106 may rely on a variety of computing resources 110 provided by the computing resource service provider to operate. For instance, a customer service 106 may include one or more virtual machine instances that may be utilized to support the aforementioned website or business applications. Further, these instances may be used to support database applications, electronic commerce applications, business applications and/or other applications. The one or more customer services 106 may further rely on one or more other services 108 provided by the computing resource service provider, a different service provider, or through a customer's other services operating in a separate environment (e.g., on-premises). These other services 108 may include archival storage services, object-based data storage services, database services, computing resource monitoring services, and the like.

In an embodiment, a customer of the computing resource service provider can configure the load balancer 102 to determine metering data based at least in part on the received API requests from various users. For instance, a customer may specify, in its request to provision a load balancer 102 for its one or more customer services 106, that the load balancer is to obtain and batch metering data for each user submitting API requests to the one or more customer services 106, the load balancer 102 perform these operations as API requests are received. Further, the load balancer 102 may transmit this metering data to the customer for its review or to a metering service configured to utilize the metering data to identify a billing structure for the various users utilizing the one or more customer services 106. For instance, the computing resource service provide may obtain a portion of a total fee charged by the customer for processing of each API request obtained by through the load balancer 102. The computing resource service provider may incentivize certain metering data preferences. For instance, a larger portion of the total fee may be apportioned to the computing resource service provider if the load balancer 102 is configured to transmit metering data obtained from each request immediately to the customer, rather than batching the data and providing the data to the metering service for analysis and billing. In some embodiments, the load balancer 102 can provide each user with a copy of its metering data to support conflict resolution in the event that there is a disagreement between the user and the customer with regards to billing for use of the customer services 106.

Figure 2:
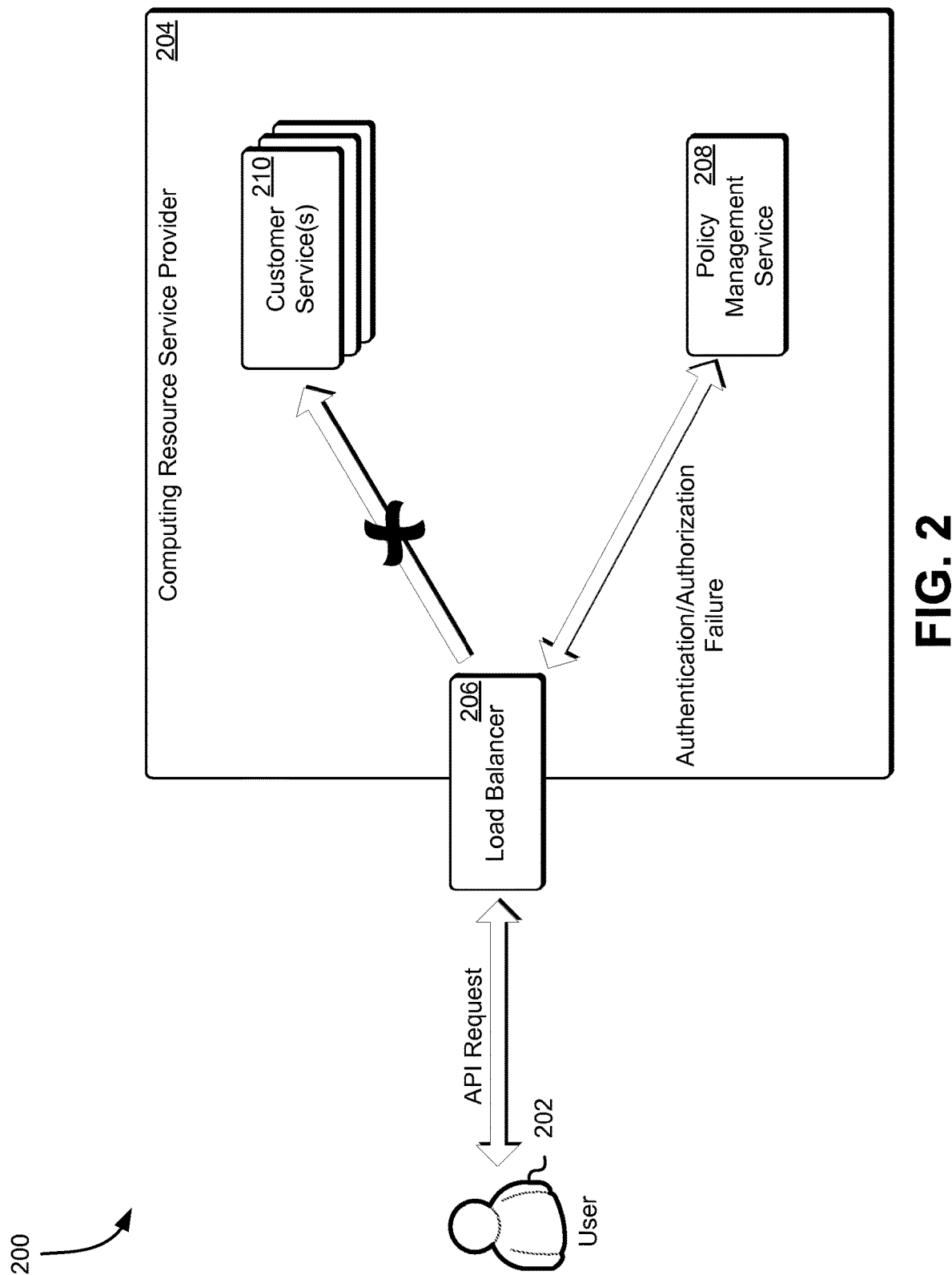
FIG. 2 shows an illustrative example of an environment in which a load balancer for one or more customer services does not transmit an application programming interface request to the one or more customer services due to an authentication or authorization failure.

As noted above, a customer of a computing resource service provider may submit a request to a load balancing service to provision a load balancer for a variety of its services and/or computing resources. The customer may specify one or more policies that may be used to determine whether a user submitting an API request to the customer services is authorized to perform the requested operations using the customer services. Further, the customer may specify the authentication processes to be performed to ensure that the API request and the user can be authenticated prior to transmitting the API request to the customer services for further processing. If the authentication or authorization processes performed by the load balancer result in a failure, the API request may be denied. Accordingly, FIG. 2 shows an illustrative example of an environment 200 in which a load balancer 206 for one or more customer services 210 does not transmit an API request to the one or more customer services 210 due to an authentication or authorization failure.

In the environment 200, a user 202 transmits one or more API requests destined for one or more customer services 210 to the computing resource service provider 204. The API request may specify an identifier of the user 202, the one or more operations to be performed using one or more computing resources of the customer services 210, and a digital signature. The digital signature may be created by the user 202 through use of a cryptographic key and the API request itself. In some instances, the API request may include one or more user credentials that may be used to authenticate the user prior to transmittal of the API request to the one or more customer services 210.

The load balancer 206 may obtain the API request from the user 202 and transmits the API request to the policy management service 208 to determine whether the user 202 may be authenticated. In some embodiments, the load balancer 206 generates a request that includes the API request, provided user 202 credentials, information about the original API request (e.g., method used to transmit the API request, a uniform resource identifier used in the request, headers, etc.), any customer account information associated with the target customer services 210, the IP address of the user 202 making the API request, and the like. The policy management service 208 may obtain this request from the load balancer 206 and utilize the provided information in the request to determine whether the user 202 is authenticated. For instance, the policy management service 208 may identify the user's account within the computing resource service provider and determine whether the set of credentials provided by the user 202 are authentic. Alternatively, if the API request provided by the user 202 included a digital signature, the policy management service 208 may utilize a cryptographic key for the user 202 and the API request itself to calculate the digital signature to determine if the digital signatures match. If there is no match, then the user 202 may not be authenticated.

In some embodiments, the authentication of the user 202 is performed by the load balancer 206 itself. For instance, the customer, in configuring the load balancer 206, may provide the load balancer 206 with a universal cryptographic key or a cryptographic key for each user that may be granted access to the one or more customer services 210. For instance, if the API request includes a digital signature, the load balancer 206 may identify the user 202 making the API request and the corresponding cryptographic key for the user 202 (e.g., unique cryptographic key, universal cryptographic key, etc.). The load balancer 206 may utilize the identified cryptographic key for the user 202 and the API request itself to calculate an expected digital signature for the API request. If there is a mismatch, then the load balancer 206 may be unable to authenticate the user 202. This may result in the load balancer 206 denying the API request and transmitting an error message to the user 202, such as a 400-series HTTP error. Further, the load balancer 206 may not transmit the API request to the one or more customer services 210.

If the user 202 is authenticated successfully, the policy management service 208 may transmit a notification specifying one or more applicable policies for the user 202, the one or more customer services 210, and the customer's account. Alternatively, if the authentication of the user 202 was performed by the load balancer 206 itself, the load balancer 206 may transmit a request to the policy management service 208 to identify any applicable policies for the user 202, the one or more customer services 210, and the customer's account that may be utilized to determine whether the user 202 is authorized to perform the requested operations specified in the API request. The load balancer 206 may evaluate the specified policies to determine whether there are any policies that are not stored within the policy cache of the load balancer 206. If the policy cache does not have stored one or more of the identified policies, the load balancer 206 may transmit a request to the policy management service 208 to obtain any of these missing policies.

The load balancer 206 may evaluate the applicable policies to determine whether the user 202 is authorized to perform the operations specified within the API request. For instance, if the load balancer 206 determines that one or more policies explicitly forbid the user 202 from performing the requested operations, the load balancer 206 may determine that the user 202 is not authorized to perform the requested operations and, thereby, deny the API request. Similar to the authentication failure described above, the load balancer 206 may transmit a 400-series HTTP error message or a different error message in an alternative format the user 202 to indicate that its request has been denied.

In an embodiment, the load balancer 206 can be configured by a customer to determine whether the API request originates from a private entity (e.g., user associated with a customer account) or from a public entity (e.g., user associated with an account not associated with the customer). For instance, a customer may configure the load balancer 206 to be accessible only by users associated with the customer account, users associated with particular accounts, or any users regardless of their associated accounts. Thus, if the API request obtained by the load balancer 206 was provided by a user 202 associated with an account other than a customer account, the load balancer 206 may deny the API request if the load balancer 206 was configured to only be accessible by users associated with the customer account or with specific accounts not including the account to which the user 202 belongs.

Figure 3:
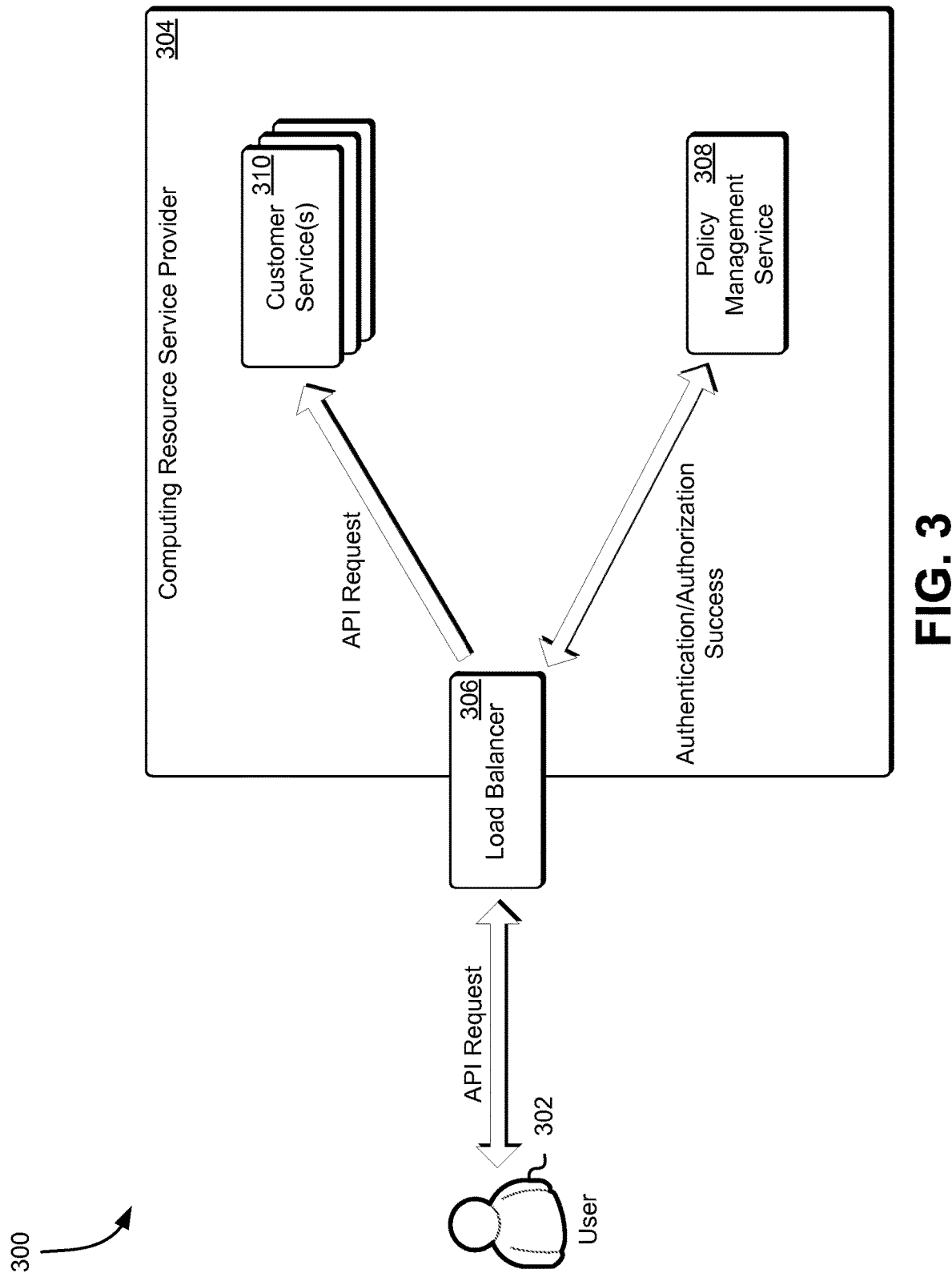
FIG. 3 shows an illustrative example of an environment in which a load balancer for one or more customer services transmits an incoming application programming interface request to the one or more customers services as a result of successful authentication and authorization of a user.

FIG. 3 shows an illustrative example of an environment 300 in which a load balancer 306 for one or more customer services 310 transmits an incoming API request to the one or more customers services 310 as a result of successful authentication and authorization of a user 302. The environment 300 is similar to the environment described above in connection with FIG. 2. For instance, the user 302 may transmit one or more API requests destined for one or more customer services 310 to the computing resource service provider 304. The load balancer 306 may receive the one or more API requests from the user and generate a request to the policy management service 308 to determine whether the user 302 can be authenticated. In this particular illustrative example, the policy management service 308 may determine that the API request is authentic. For instance, if the API request is digitally signed by the user 302, the policy management service 308 may utilize a cryptographic key of the user 302 and the body of the API request to generate an expected digital signature. If the digital signature of the API requested and the expected digital signature match, then the API request may be deemed authentic by the policy management service 308.

As noted above, in some embodiments, the load balancer 306 can locally (e.g., relative to the load balancer 306) determine whether the API request from the user 302 is authentic. For instance, if the load balancer 306 has stored the universal cryptographic key for the users of the customer service 310 or the unique cryptographic key for the particular user 302, the load balancer 306 may calculate the expected digital signature for the API request and evaluate the digital signature from the API request to determine if there is a match. If there is a match, then the load balancer 306 may determine that the API request is authentic.

If the API request is authentic, the policy management service 308 may transmit a notification specifying one or more policies applicable to the user 302 making the API request, the targeted customer services 310, and the customer account associated with the customer services 310. The load balancer 306 may evaluate its policy cache to determine whether any of the specified policies are missing from the policy cache. If so, the load balancer 306 may transmit a request to the policy management service 308 to obtain the missing policies and store these policies in the cache. Further, the load balancer 306 may evaluate the identified policies to determine whether the user 302 is authorized to perform the requested operations specified in the API request.

As illustrated in FIG. 3, the load balancer 306 may determine, based at least in part on an evaluation of the identified policies, that the user 302 is authorized to perform the requested operations. As a result, the load balancer 306 may transmit the received API request from the user 302 to the one or more customer services 310 for further processing. For instance, the load balancer 306 may add one or more HTTP headers to the API request that may be provided to the one or more customer services 310. These HTTP headers may include a user 302 identifier, an account identifier for the user 302, and the full name of the operation that was authorized. In some embodiments, if the load balancer 306 is configured to allow anonymous API requests to be provided to the customer service 310 (e.g., authentication and authorization procedures are not performed), the load balancer 306 may provide the API request without any HTTP headers but may indicate that the API request has been provided anonymously.

In an embodiment, the load balancer 306, if the API request is successfully authenticated and authorized, may determine metering data for the user 302 that may be used for billing the user 302 for processing of the API request and performance of the requested operations. For instance, a customer of the computing resource service provider 304, may provide configuration information to the load balancer 306 that may be used to obtain metering data for user API requests according to the customer's preferences. For example, a customer may specify that the load balancer 306 is to batch metering data for each user 302 over a particular period of time. Further, the customer may specify that this batched metering data is to be provided to the customer itself or to a dedicated metering service of the computing resource service provider 304 for processing. For instance, the metering service may utilize the batched metering data from the load balancer 306 to determine the billings for each user 302 utilizing the customer services 310. This may enable the metering service to provide, on behalf of the customer, billing statements and a cost breakdown to each user 302 of the customer services 310. Alternatively, if the load balancer 306 is configured to provide the metering data to the customer, the customer may generate its own billing statements. However, the load balancer 306 may further provide metering data to the one or more users 302. This may enable the one or more users 302 and the customer to utilize the same metering data to resolve any billing disputes.

Figure 4:
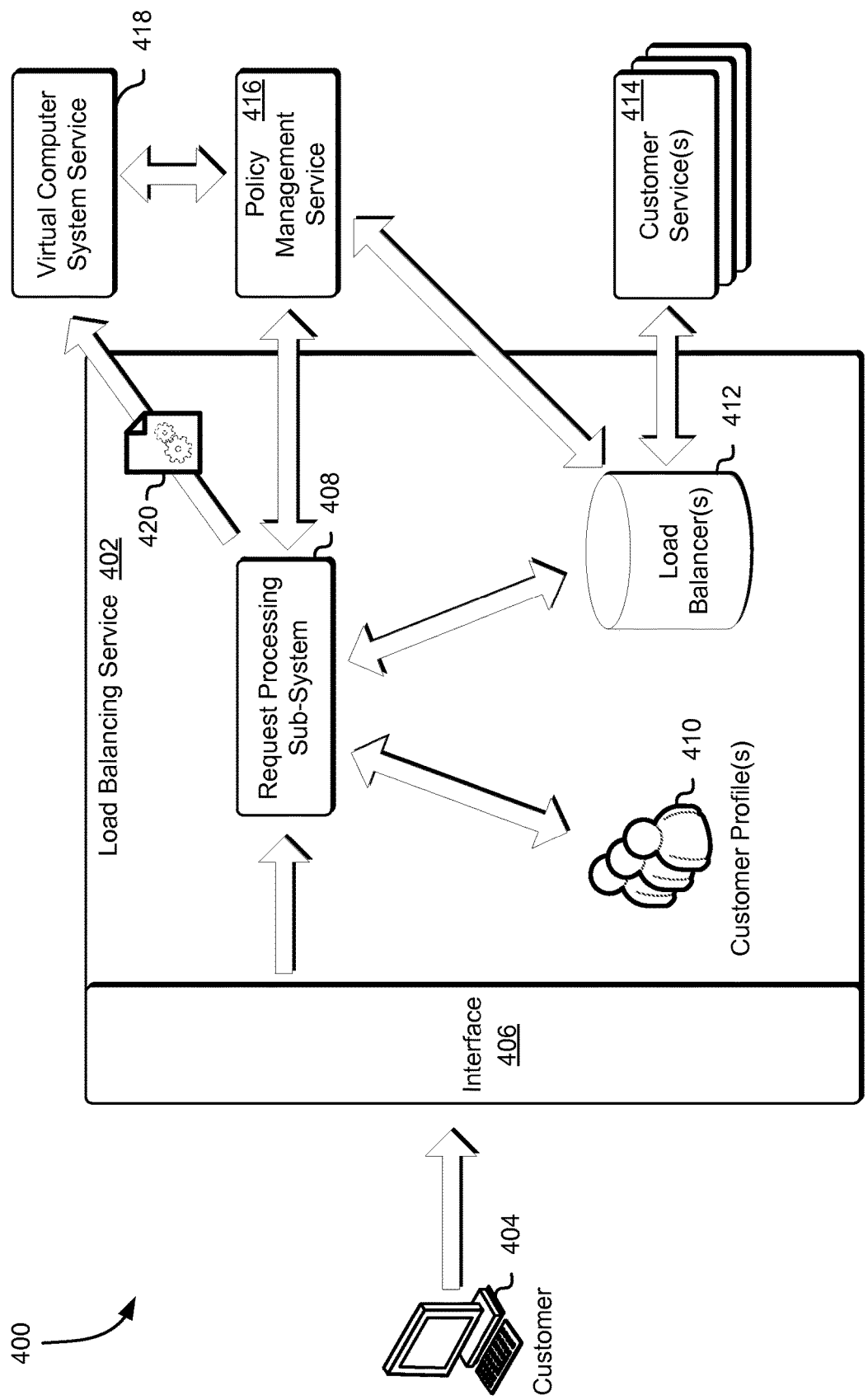
FIG. 4 shows an illustrative example of an environment in which a load balancing service configures one or more load balancers for one or more customer services in response to a customer request to activate one or more load balancers for its services.

As noted above, a customer of a computing resource service provider may transmit a request to a load balancing service to configure one or more load balancers for its services and computing resources. The request may include one or more policies that may be used to determine whether incoming API requests for the customer services are authorized, as well as other customer preferences that may be used to identify users that may access the customer services as well as any metering data preferences for the collection and distribution of metering data for any users accessing the customer services. Accordingly, FIG. 4 shows an illustrative example of an environment 400 in which a load balancing service 402 configures one or more load balancers for one or more customer services 414 in response to a customer request to activate one or more load balancers for its services 414. The load balancing service 402 may include one or more computer systems configured to process incoming requests from customers of the computing resource service provider to provision and manage load balancers for one or more customer services 414.

In the environment 400, the load balancing service 402 may include an interface 406, which may be accessible to one or more customers 404 of the computing resource service provider for the provisioning and maintenance of one or more load balancers. From the interface 406, a customer 404 may select the one or more customer services 414 that the load balancer to be provisioned will be responsible for balancing network traffic, as well as the one or more preferences for the load balancer. In some embodiments, the interface 406 is connected to a marketplace provided by the computing resource service provider which may specify a number of available virtual machine images for load balancers available to the customer 404. Further, the marketplace may indicate the cost to the customer 404 to provision each different available load balancer. The interface 406 may include a graphical user interface (GUI) configured to enable the customer 404 to visually evaluate the various load balancer options and to provide its preferences for the selected load balancer. For instance, the interface 406 may transmit a request to the request processing sub-system 408 of the load balancing service 402 to identify any customer services 414 associated with the customer 404. The request may include a customer identifier that may be used to identify a customer profile within the customer profile data store 410. This customer profile may specify the one or more customer services 414 associated with the customer 404.

The request processing sub-system 408, which may include one or more computer systems of the load balancing service 402 that may be configured to process any incoming customer requests or requests from the interface 406, may transmit identifiers corresponding to the customer services 414 associated with the customer 404 to the interface 406. This may cause the interface 406 to provide the customer 404 with these customer service identifiers, which the customer 404 may use to determine which customer services 414 are to be associated with the requested load balancer. The customer 404, through the interface 406, may provide its selection of the customer services 414, its selection of the virtual machine image for the load balancer, policies that are to be used to authenticate/authorize users to access the specified customer services 414, and any additional customer preferences for the load balancer to the request processing sub-system 408.

In response to the request from the customer 404 to provision a new load balancer, the request processing sub-system 408 may access a load balancer image repository 412 to obtain a virtual machine image of the requested load balancer. The load balancer image repository 412 may include a variety of different virtual machine images for load balancers that may be used in conjunction with customer services and computing resources maintained by the computing resource service provider. The virtual machine images may be provided by different vendors and may each be subject to different prices and cost structures. For instance, a customer 404 may be required to pay a vendor for use of a particular virtual machine image per request processed using the provisioned load balancer. Alternatively, a customer 404 may be required to pay a vendor for the amount of time the load balancer is in use in conjunction with the customer services 414. This information may be provided to the customer 404 through the interface 406 in response to selecting an appropriate load balancer for its customer services 414.

The request processing sub-system 408 may instantiate the virtual machine image for the load balancer onto a physical host of a virtual computer system service 418. The virtual computer system service 418 may include a plurality of physical hosts configured to instantiate virtual machine instances onto virtual computer systems on behalf of the customers of the computing resource service provider. Customers of the computing resource service provider may interact with the virtual computer system service to provision and operate virtual computer systems that are instantiated on physical computing devices hosted (e.g., servers) and operated by the computing resource service provider. The virtual computer systems may be used for various purposes, such as to operate as servers supporting a website. Other applications for the virtual computer systems may be to support database applications, electronic commerce applications, business applications and/or other applications. In an embodiment, the request processing sub-system 408 identifies a physical host of the virtual computer system service 418 that can be utilized to instantiate the virtual machine image of the load balancer and transmits a request to the virtual computer system service 418 to instantiate the image onto the selected physical host.

The request processing sub-system 418 may further generate a configuration file 420 for the load balancer operating within a physical host of the virtual computer system service 418. This configuration file 420 may specify any customer preferences for evaluating incoming API requests, as well as any preferences related to the extraction and handling of metering data from the received API requests. For instance, the configuration file 420 may specify whether authentication/authorization of users is required prior to transmitting any API requests from users to the customer services 414. Further, the configuration file 420 may include one or more cryptographic keys for authorized users that may be used to authenticate any incoming API requests from known users. The configuration file 420 may further specify whether authentication of users may be performed by the load balancer locally or through use of the policy management service 416 as described below. The customer 404 may utilize the interface 406 to provide updated configuration files 420 at any time should it want to change the configuration of any existing load balancers used for its customer services 414.

In an embodiment, the request processing sub-system 408 transmits any policies provided by the customer 404 to a policy management service 416 of the computing resource service provider. The policies may, for example, be utilized to establish, for one or more users of the customer services 414, a level of access to one or more resources provisioned by or for the customer 404 and, generally, access rights with respect to the one or more resources provisioned by/for the customer 404. The customer 404 may be a user of a computing resource service provider that utilizes one or more services such as a virtual computer system service, object-based data storage services, database services, a policy management service and configuration and management service as well as a plurality of other services to create and manage resources and to support operational needs.

The policies may be authored in a default state such as, for example, denying all access or granting all access. The policies may also be authored based on customer 404 business needs and/or may be based on roles within the customer's organization so that, for example, all software developers have the same policy. These policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

A policy management service 416 may provide access to, and administration of, policies applicable to requests for access to customer services 414 (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend may receive a request for access to resources and may generate a query to the policy management service based at least in part on information specified by the request.

The policy management service 416 may be one of a plurality of services provided by a computing resource service provider. In some embodiments, the policy management service is a distributed computer system configured to centrally manage policies for multiple services operated by the computing resource service provider. Requests for access to service resources (i.e., requests whose fulfillment involves access to the resources themselves and/or information about the resources) may be evaluated against one or more policies associated with the request and/or associated with the requester and those requests that are allowable based on those polices may be performed. API calls to create, edit, and/or delete policies may also be received by the policy management service. As policies may change, so too may the scope of requests that are allowable change. For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions.

In an embodiment, in response to the load balancer operating within the virtual computer system service 418 obtaining an API request from a user to perform one or more operations using at least one customer service 414, the load balancer may transmit the API request to the policy management service 416, which may determine whether the API request can be authenticated. For instance, if the API request is digitally signed by the user, the policy management service 416 may utilize a cryptographic key corresponding to the user and provided by the customer 404 to calculate an expected digital signature. This expected digital signature may be used to determine whether the digital signature of the API request is authentic or not. If the API request is determined to be not authentic, the policy management service 416 may transmit a notification to the load balancer indicating that the API request is not authentic. In response to this notification, the load balancer may deny the API request and transmit an error message, such as a 400-series HTTP error message, to the user.

If the API request is determined to be authentic, the policy management service 416 may transmit a notification specifying one or more applicable policies that may be used to determine whether the user is authorized to perform the operations specified in the API request. In an embodiment, the load balancer includes a policy cache, which may include one or more policies that may have previously been obtained by the load balancer in response to earlier API requests or that may have been provided by the customer 404 in the configuration file 420. If any of the specified policies are not stored within the policy cache, the load balancer may transmit a request to the policy management service 416 to obtain the missing policies. The load balancer may evaluate the applicable policies to determine whether the user is authorized to perform the specified operations. If the user is not authorized to perform the specified operations, the load balancer may deny the API request and transmit an error message to the user (e.g., 400-series HTTP error message, etc.). However, if the policies specify that the user is authorized to perform the one or more operations or the policies are silent with regard to these one or more operations, the load balancer may transmit the API request to the customer services 414 for processing.

Figure 5:
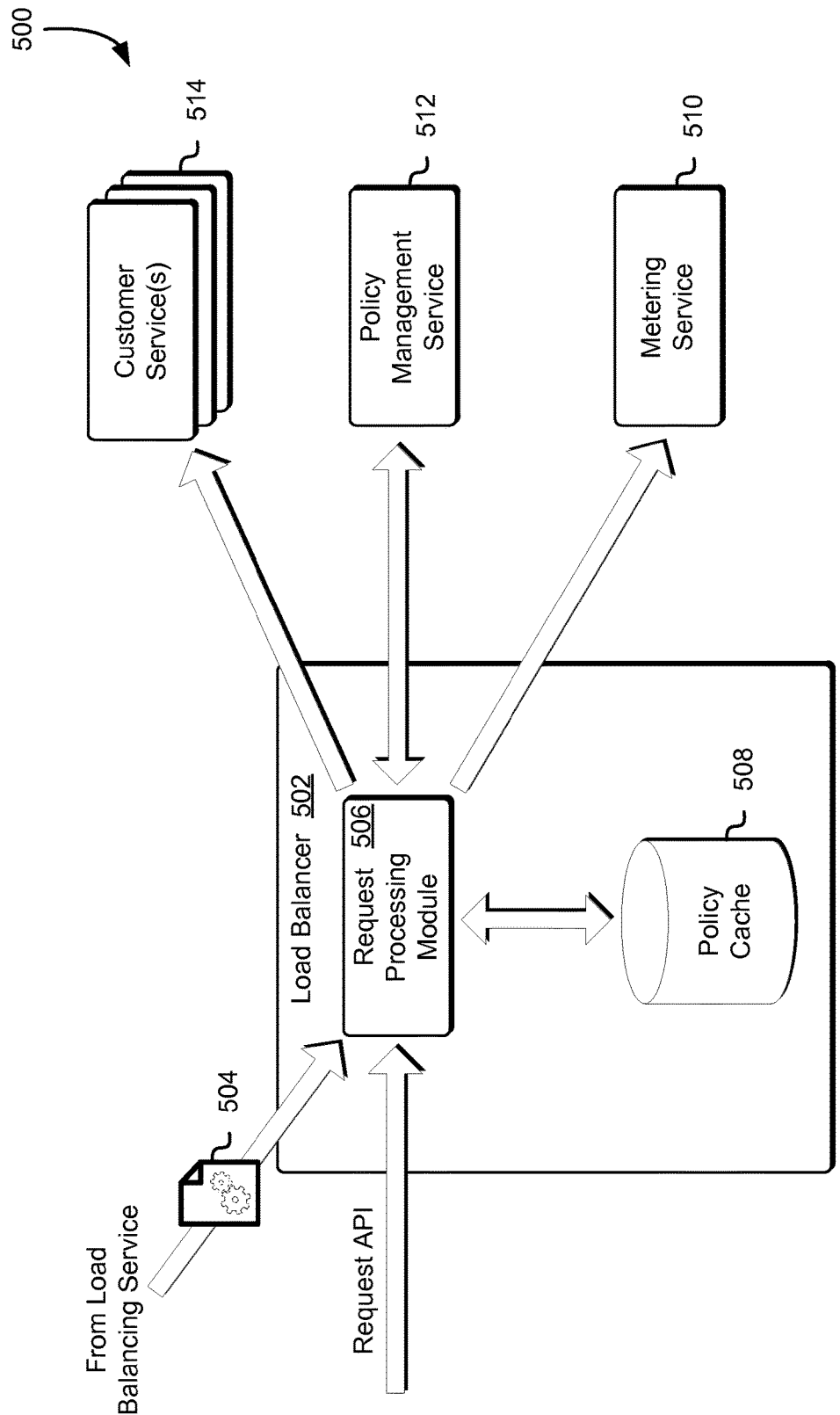
FIG. 5 shows an illustrative example of an environment in which a load balancer obtains configuration information from a load balancing service and processes incoming application programming interface requests for delivery to one or more customer services in accordance with at least one embodiment.

As noted above, the load balancer may process incoming API requests to determine whether the API request may be transmitted to one or more customer services on behalf of a user. For instance, the load balancer, in conjunction with a policy management service, may perform authentication and authorization analyses to determine whether the received API request is authentic and the user is authorized to perform the operations specified in the API request. In some embodiments, the load balancer also determines metering data from the incoming API requests that may be provided to the customer to manage billing of the user for use of its services or to a metering service, which may aggregate the data and manage the billing of the user on behalf of the customer. Accordingly, FIG. 5 shows an illustrative example of an environment 500 in which a load balancer 502 obtains configuration information 504 from a load balancing service and processes incoming API requests for delivery to one or more customer services 514 in accordance with at least one embodiment.

In the environment 500, the load balancer 502 may include a request processing module 506, which may be an application operating on the physical host utilized to instantiate the load balancer 502. The request processing module 506 may obtain one or more configuration files 504 from the load balancing service specifying particular configuration settings for the load balancer 502. For instance, a customer of the computing resource service provider may provide, through the configuration file 504, one or more cryptographic keys of users that may have access to the one or more customer services 514. These one or more cryptographic keys may be used by the request processing module 506 to authenticate any API requests from these users. In some embodiments, the configuration file 504 includes executable instructions that cause the request processing module 506 to process incoming API requests based at least in part on whether the request was provided by a public entity (e.g., user associated with an account other than the customer account) or a private entity (e.g., user associated with the customer account). For instance, if the API request is from a private entity, the request processing module 506 may transmit the API request to the one or more customer services 514 without performing additional authentication/authorization analyses. Alternatively, if the API request is from a public entity, the request processing module 506 may perform the authentication/authorization analyses as described in greater detail below.

The configuration file 504 provided by the load balancing service may further include one or more policies that may specify a level of access to the customer services 514 for a number of different users. For instance, a particular policy may specify that a user may only perform read operations through the one or more customer services 514. Thus, if this user were to transmit an API request to perform a different operation, the request processing module 506 may evaluate this policy and determine that the user is not authorized to perform this operation. Thus, the request processing module 506 may deny the API request and transmit an error message to the user indicating that the request could not be processed (e.g., 400-series HTTP error message, etc.). The policies specified in the configuration file 504 may be stored within a policy cache 508, which may include one or more storage devices or temporary storage media (e.g., memory) for storage of provided policies.

In response to receiving a new API request from a user, the request processing engine 506 may transmit the API request to a policy management service 512 to determine whether the user can be authenticated. For instance, the API request may be digitally signed using a cryptographic key of the user. The policy management service 512 may utilize a cryptographic key of the user and the body of the API request to calculate an expected digital signature for the API request. If the digital signature of the API request matches the expected digital signature calculated by the policy management service 512, the policy management service 512 may determine that the digital signature is authentic, thus authenticating the user. However, if there is no match, the policy management service 512 may determine that the digital signature is not authentic and transmit a notification to the request processing module 506 to indicate that the user could not be authenticated. This may cause the request processing module 506 to deny the API request. In some embodiments, the request processing module 506 can perform the authentication of the user locally based at least in part on its configuration. For instance, through the configuration file 504, the request processing module 506 may be configured to utilize a cryptographic key of the user to calculate the digital signature and perform the analyses that would typically be performed by the policy management service 512.

If the user is successfully authenticated, the policy management service 512 may transmit a notification to the request processing module 506 specifying identifiers for one or more policies applicable to the user, the customer account, and the customer services 514 that are to be accessed. The request processing module 506 may evaluate this notification and determine whether any of the identified policies are not stored within the policy cache 508. This may cause the request processing module 506 to transmit a request to the policy management service 512 to obtain any policies that are not stored within the policy cache 508. The request processing module 506 may evaluate the identified policies to determine whether the user is authorized to perform the requested operations. If a policy specifies that the user cannot perform any of the requested operations, the request processing module 506 may deny the API request. Alternatively, if the policies are silent with regard to the requested operations or specify that the user is authorized to perform these requested operations, the request processing module 506 may transmit the API request to the one or more customer services 514. The request processing module 506 may store any policies obtained from the policy management service 512 in the policy cache 508 for later use.

In an embodiment, the request processing module 506 is configured to determine, for each received API request, metering data that may be used for determining user billing for request processing and use of the customer services 514. For instance, the configuration file 504 may specify whether the request processing module 506 is to batch metering data for each user or a group of users associated with a unique account. Further, the configuration file 504 may specify whether the metering data determined from the incoming API requests are to be provided directly to the customer and account managers for the user accounts utilized to submit the API requests. Alternatively, the configuration file 504 may specify whether the metering data is to be provided to a metering service 510 of the computing resource service provider for processing and billing to the account managers of the user accounts. Based at least in part on these preferences, the request processing module 506 may batch the determined metering data and either provide the data to the customer or to the metering service 510.

Figure 6:
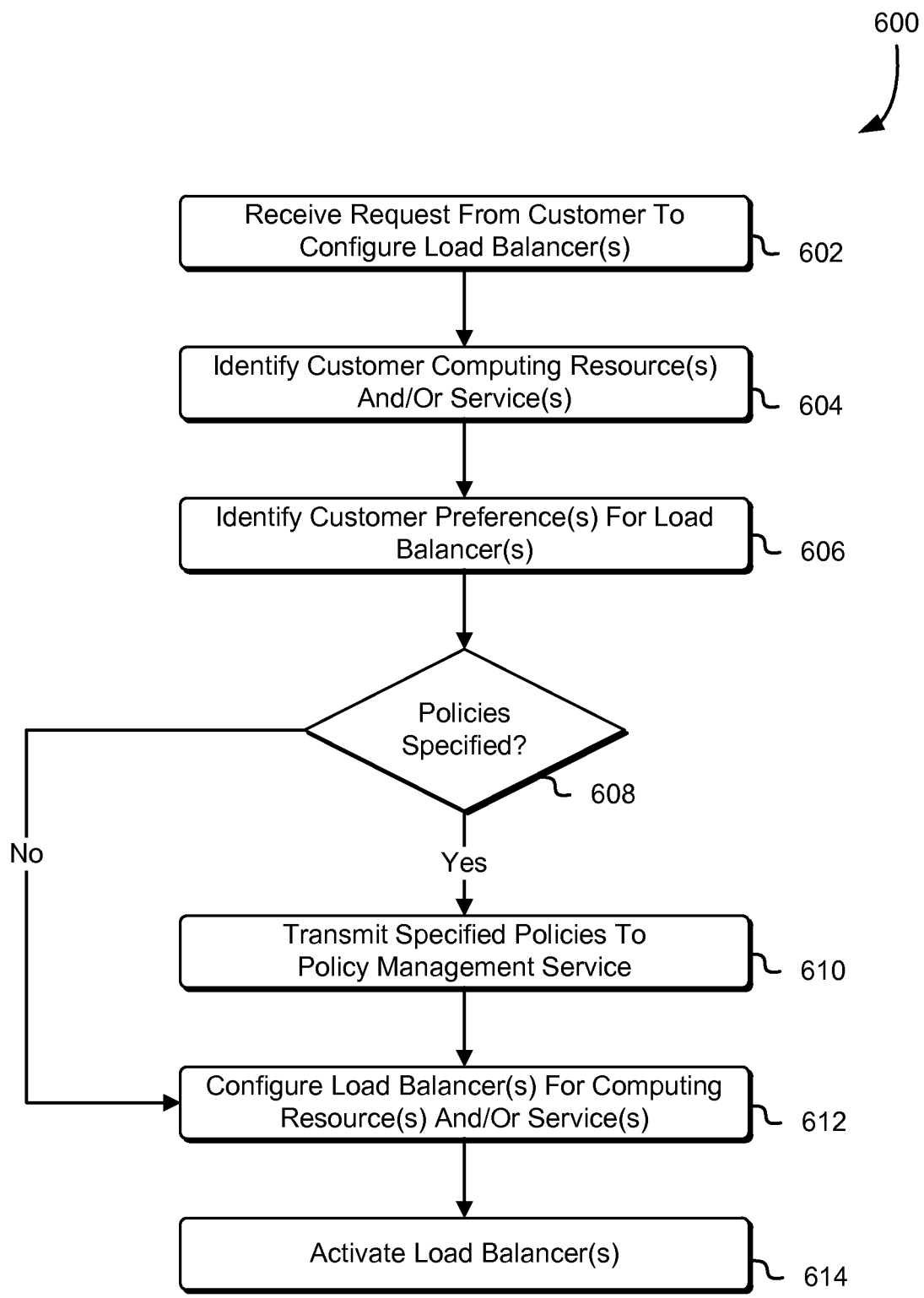
FIG. 6 shows an illustrative example of a process for activating one or more load balancers for customer services and computing resources in response to customer requests in accordance with at least one embodiment.

As noted above, a customer of a computing resource service provider may transmit a request to a load balancing service to configure one or more load balancers for its services and computing resources. The request may identify the customer's preferences for API request handling and a number of policies that may be used to determine whether a user submitting an API request is authorized to perform the various operations specified therein. Accordingly, FIG. 6 shows an illustrative example of a process 600 for activating one or more load balancers for customer services and computing resources in response to customer requests in accordance with at least one embodiment. The process 600 may be performed by the aforementioned load balancing service, which may utilize the parameters of the request from the customer to identify the load balancer to be instantiated for the customer services and to apply any customer preferences and policies as specified within the request.

At any time, the load balancing service may receive 602 a request from a customer to configure one or more load balancer for its services. The incoming request from the customer may be an API request which may specify an identifier for a virtual machine image that may be utilized to instantiate the load balancer. Alternatively, the incoming request from the customer may be provided through an interface, such as a GUI, of the load balancing service. Through this interface, a customer may access a marketplace which may include a number of different available load balancer types and configurations that may be used for the customer services. This marketplace may indicate a cost for instantiation of each of these different load balancers, as well as any operational costs incurred during the operation of the load balancer. The customer, through the interface, may select a load balancer from the marketplace and the corresponding computing resources and services that are to be attached to this load balancer. Thus, through the request, the load balancing service may identify 604 the customer computing resources and/or services that are to be attached to the load balancer.

The request from the customer to provision one or more load balancers may further include one or more customer preferences for each of these load balancers. For instance, a customer may specify that a load balancer is to pass through any API requests originating from a user associated with the customer's account while any API requests originating from users associated with different accounts may be subject to authentication and authorization checks to ensure that the user can be authenticated and that the user is authorized to make such a request. Further, the customer preferences may further specify how any metering data determined from these API requests is to be handled, whether it is batched, provided to the customer directly, or provided to a metering service for further processing. Thus, the load balancing service may identify 606 any customer preferences specified in the request for the one or more load balancers that are to be provisioned.

In addition to the customer preferences, a customer may provide one or more policies that are to be applied in response to certain incoming API requests. For instance, a customer may generate a policy that specifies that certain users may only perform certain operations using the customer services. Thus, any request from such a user to perform any other operation may be denied by the load balancer based at least in part on this policy. Thus, the load balancing service may determine 608 whether the request from the customer specifies one or more policies that are to be applied to the one or more load balancers that are to be provisioned. If the request does specify one or more policies, the load balancing may transmit 610 these specified policies to a policy management service, where the policies may be maintained and provided in response to requests from a load balancer to obtain any policies applicable to the user making the API request, the customer services, or the customer account.

If the customer request does not specify any applicable policies or the load balancing service has transmitted the specified policies to the policy management service, the load balancing service may configure 612 the one or more requested load balancers for the customer's computing resources and services. For instance, the load balancing service may access a load balancer image repository to obtain one or more virtual machine images for the requested one or more load balancers and instantiate these one or more virtual machine images onto physical hosts of a virtual computer system service. In an embodiment, the load balancing service generates a configuration file for each created load balancer. This configuration file may specify one or more IP addresses for the identified customer computing resources and services. Further, the configuration file may include executable instructions that may cause the load balancer to process incoming API requests per the customer's preferences. The load balancing service may additionally perform one or more diagnostic or test operations using the load balancer to ensure that the load balancer will function properly. If the configuration and testing of the one or more load balancers is successful, the load balancing service may activate 614 these one or more load balancers to enable processing of incoming API requests directed towards the customer's computing resources and services.

Figure 7:
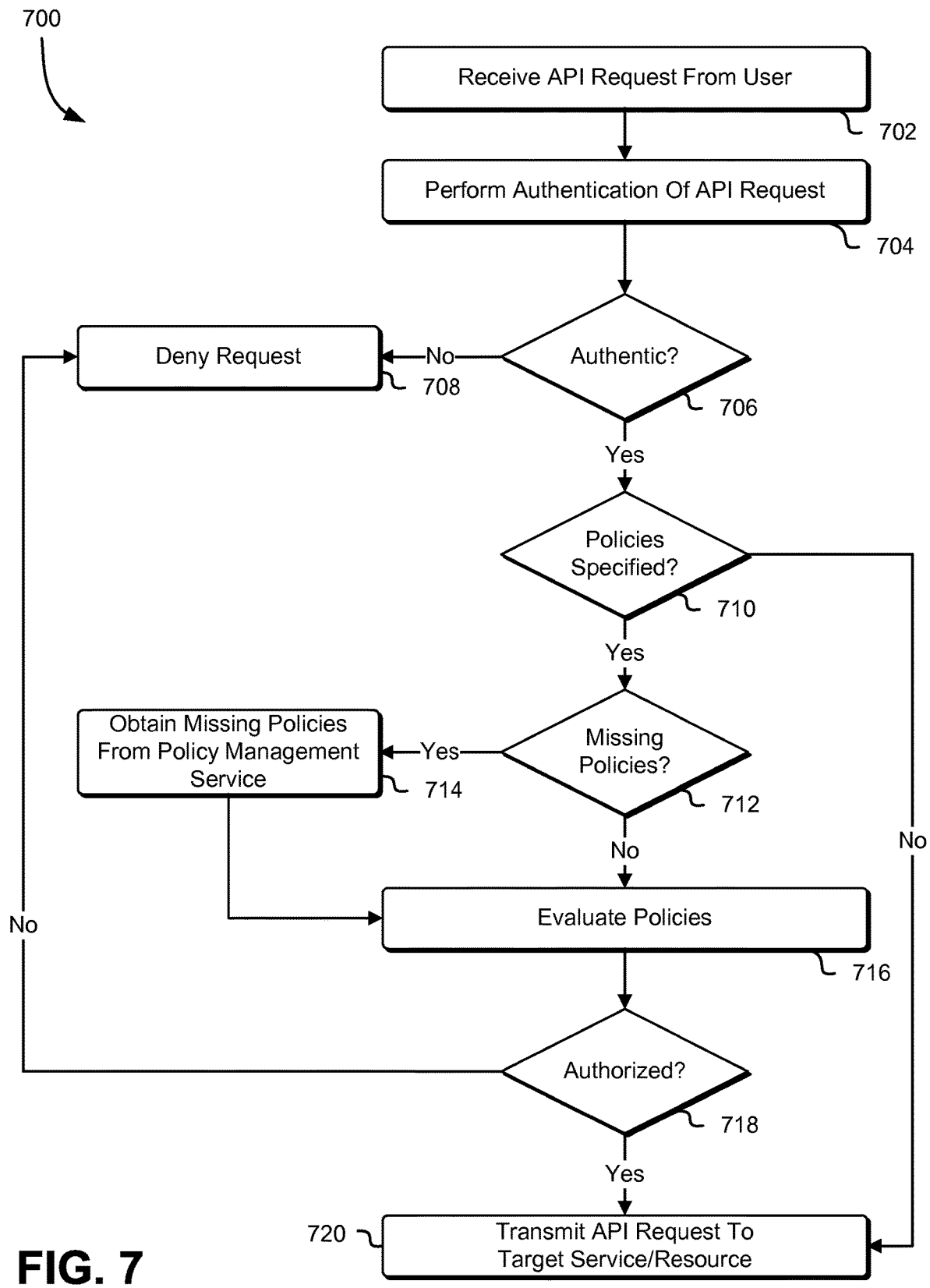
FIG. 7 shows an illustrative example of a process for processing and delivering application programming interface requests to one or more customer services and computing resources in accordance with at least one embodiment.

As noted above, a load balancer may be configured to process API requests to determine whether the API requests are to be transmitted to the target customer services and computing resources or denied. For instance, the load balancer, in conjunction with a policy management service, may perform authentication and authorization analyses for incoming API requests to determine whether these API requests should be transmitted to the target services. If these analyses are not completed successfully, the API requests may be denied by the load balancer. Accordingly, FIG. 7 shows an illustrative example of a process 700 for processing and delivering API requests to one or more customer services and computing resources in accordance with at least one embodiment. The process 700 may be performed by a load balancer associated with one or more customer services and computing resources and which may be configured to interact with a policy management service to obtain policies necessary to evaluate incoming API requests whose fulfillment involves access to a computing resource of the one or more computing resources associated with the customer.

At any time, the load balancer may receive 702 an API request from a user to perform one or more operations using specific customer services and/or resources. The API request may specify a user identifier, an account identifier for the user's account, the operations to be performed, the targeted services and/or resources, and a digital signature. The load balancer may perform 704 authentication of the API request to determine 706 whether this received API request is authentic or not. In an embodiment, the load balancer transmits the API request from the user to a policy management service for authentication. The policy management service may utilize a cryptographic key for the user and the body of the API request to generate an expected digital signature that may be used to determine whether the provided digital signature is authentic. If the digital signatures do not match, then the policy management service may determine that the digital signature is not authentic. However, if there is a match, then the digital signature may be deemed to be authentic. In some embodiments, the API request includes a representation of the user's set of credentials. The policy management service may evaluate this representation of the set of the credentials to determine their validity such that if they are valid, then the API request is authentic. In an alternative embodiment, the load balancer is configured to perform authentication of the incoming API request locally without need to transmit the API request to the policy management service. For instance, through a configuration file, the load balancer may be provided with cryptographic keys for a number of users. Thus, the load balancer may utilize a cryptographic key for the user to calculate the expected digital signature. In yet another embodiment, the load balancer transmits the API request to an authentication service dedicated to determining whether incoming API requests are authentic or not. This authentication service may be a separate service than the policy management service, which may be configured to perform authorization determinations instead of both authentication and authorization determinations.

If the API request from the user is determined to not be authentic, the load balancer may deny 708 the request. The load balancer may transmit a notification to the user indicating that the API request could not be processed, such as through a 400-series HTTP error message. Alternatively, if the API request is deemed authentic, the policy management service may transmit a notification to the load balancer specifying one or more policies that may be applicable to the user making the API request, the user's account, the customer account, and the targeted customer services and computing resources. Thus, the load balancer may determine 710 whether there are any policies specified in the response from the policy management service or within the policy cache that may be applicable to the API request. If no policies are specified, the load balancer may transmit 720 the API request to the target customer services and/or computing resources for further processing.

If there are one or more policies specified, the load balancer may determine 712 whether it is missing any policies that may need to be evaluated to determine whether the user making the API request is authorized to perform the operations specified in the request. For instance, the load balancer may access the policy cache to identify which policies are available to the load balancer through the policy cache. If there are any missing policies, the load balancer may transmit a request to the policy management service to obtain 714 the missing policies. This may cause the policy management service to retrieve the missing policies from its policy data store and transmit these policies to the load balancer for its use. The load balancer may store these policies from the policy management service in the policy cache for future use.

The load balancer may evaluate 716 the one or more applicable policies to determine 718 whether the user is authorized to perform the requested operations using the customer services and/or computing resources. For instance, the policies may specify that the user may only perform read operations using the customer services and/or computing resources. Alternatively, the policies may specify that the user may not perform any operations using these customer services and/or computing resources. If, through evaluation of the policies, the load balancer determines that the user is not authorized to perform the specified operations, the load balancer may deny 708 the API request and transmit a notification to the user that the request could not be processed. However, if the load balancer determines that the user is authorized to perform the requested operations, the load balancer may update the headers of the API request and transmit 720 the API request to the target services and/or computing resources subject to distribution of incoming API requests to the one or more customer services in order to optimize resource utilization and/or avoid overloading a particular customer service or computing resource.

Figure 8:
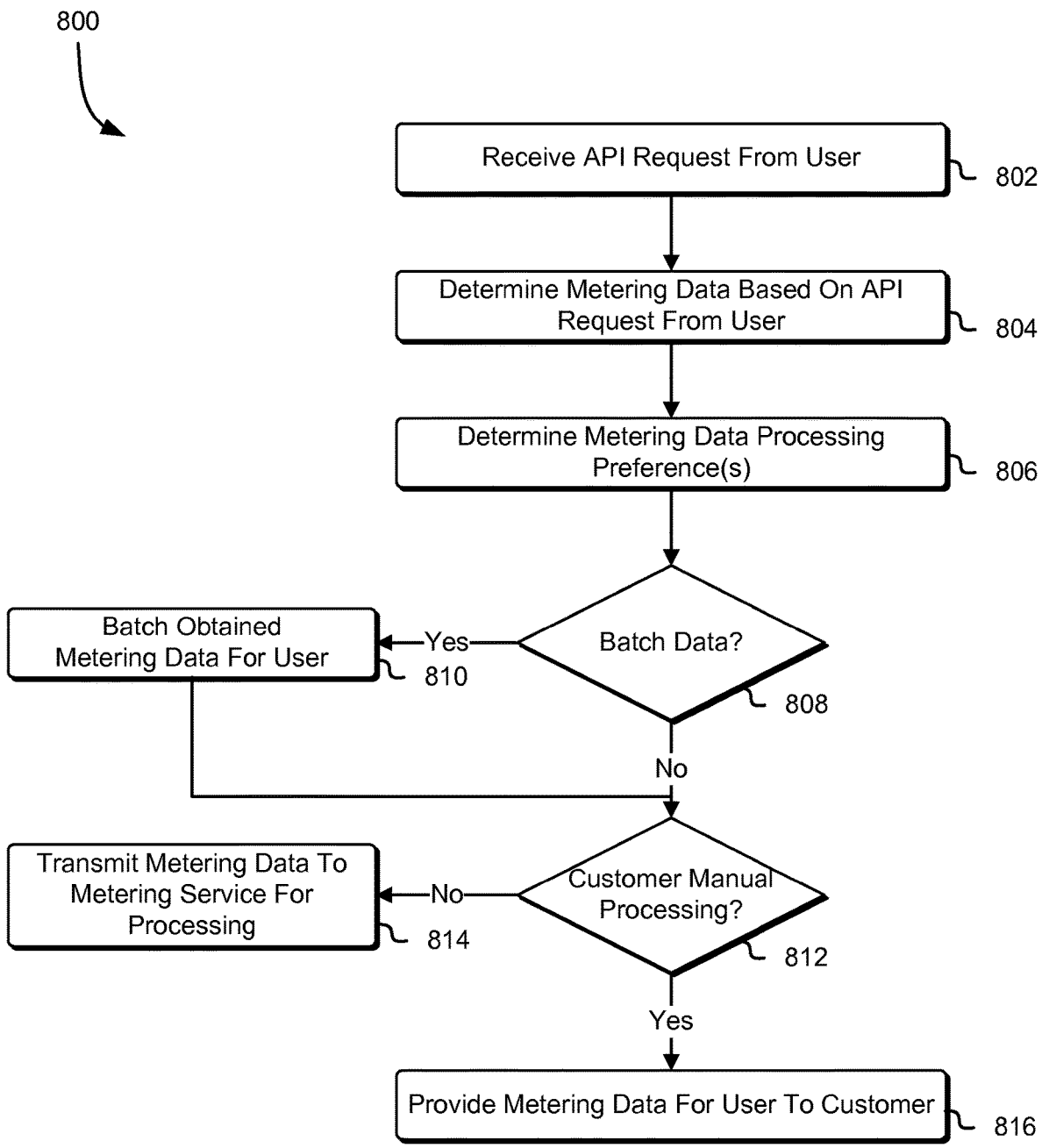
FIG. 8 shows an illustrative example of a process for determining and processing metering data based at least in part on received application programming interface requests from one or more users in accordance with at least one embodiment.

As noted above, the load balancer may be configured to determine metering data based at least in part on received API requests from various users. For instance, the load balancer may batch metering data for each user over a particular time period to enable customers or a metering service to determine billing of the user for its usage of the customer services and/or computing resources. Accordingly, FIG. 8 shows an illustrative example of a process 800 for determining and processing metering data based at least in part on received application programming interface requests from one or more users in accordance with at least one embodiment. The process 800 may be performed by the aforementioned load balancer, which may be configured to process metering data according to a customer's preferences and/or default settings established by the load balancing service.

Similar to the process 700 described above in connection with FIG. 7, the load balancer may receive 802 an API request from a user to perform one or more operations using customer services and/or computing resources. Based at least in part on the operations specified within the API request and the customer's preferences, the load balancer may further determine 804 the metering data. For instance, the load balancer may record any operations requested by the user through the API request. Each of these operations may be subject to a particular pricing schema that may be used by the customer or a metering service to determine how much a user is to be billed for its use of the customer services and/or computing resources. It should be noted that the process 800 may be performed in response to an API request initially received from the customer, in response to transmission of the API request to the one or more customer services for processing, and/or in response to receiving a response from the one or more customer services in response to processing of the API request.

The load balancer may further determine 806 any metering data processing preferences for the customer. For instance, a customer may specify that metering data for each API request is to be transmitted upon collection to the customer for its business needs. Alternatively, a customer may specify that the metering data is to be batched and aggregated over a period of time prior to delivery to the customer. A customer may also specify, through these preferences, that the metering data is to be provided to a metering service, which may process the metering data and transmit billing statements to each user of the customer services and/or computing resources. The load balancer may utilize these preferences to determine 808 whether the metering data is to be batched per user. If so, the load balancer may batch 810 the obtained metering data for the user.

Regardless of whether the metering data is batched per user or not, the load balancer may determine 812 whether the metering data is to be processed manually by the customer. If so, the load balancer may provide 816 the metering data for the user to the customer. For instance, if the metering data has been batched for the user, the load balancer may provide this batched data to the customer to enable the customer to generate its own billing statements for the user. Alternatively, if the metering data is to be processed by a metering service of the computing resource service provider, the load balancer may transmit 814 the metering data for the user to the metering service for additional processing. This may include determination of billing responsibilities for the user, creation of billing statements, and the like on behalf of the customer.

Figure 9:
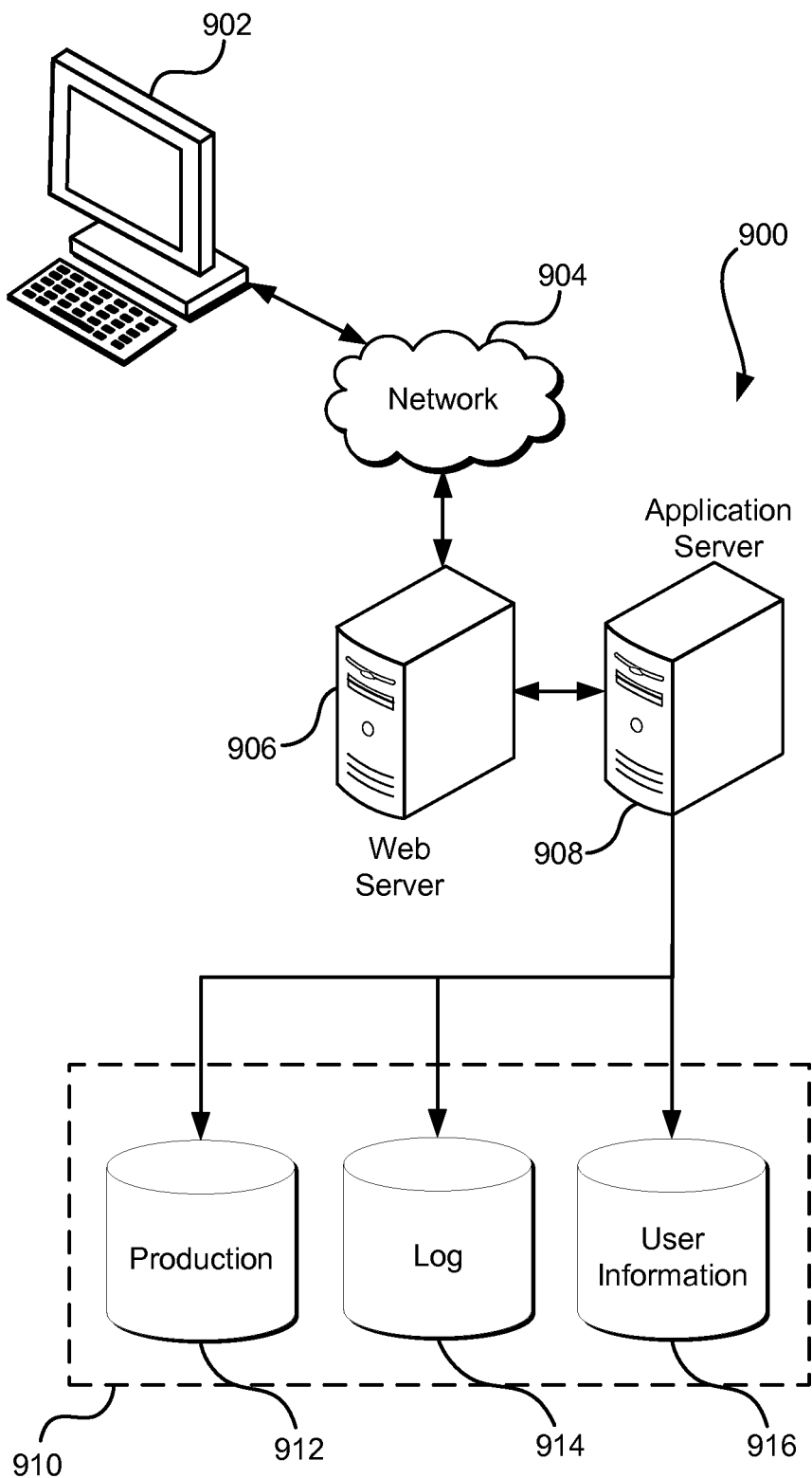
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a customer request to provision a network load balancer for one or more computing resources of a customer, the customer request specifying one or more policies and information usable to authenticate users of the one or more computing resources, to determine whether the users of the one or more computing resources are authorized to perform operations using the one or more computing resources, and to specify one or more preferences usable to identify a virtual machine image to instantiate the network load balancer on to a physical host system;
identifying, based at least in part on the one or more preferences, the virtual machine image to instantiate the network load balancer;
obtaining, from a repository of virtual machine images, the virtual machine image to instantiate the network load balancer;
provisioning the network load balancer for the one or more computing resources of the customer;
generating a configuration file based at least in part on the information from the customer request, the configuration file specifying executable instructions for analyzing application programming interface requests from users of the one or more computing resources; and
transmitting the configuration file to the network load balancer to configure the network load balancer to:
receive an application programming interface request to perform one or more operations using at least one computing resource of the customer, the application programming interface request specifying the one or more operations, a user identifier, and a digital signature;
verify, based at least in part on an analysis of the digital signature, that the digital signature is authentic;
evaluate the one or more policies to determine whether a user associated with the user identifier is authorized to perform the one or more operations; and
transmit the application programming interface request to at least one computing resource of the customer based at least in part on resource utilization optimization.

2. The computer-implemented method of claim 1, wherein the configuration file is further used to configure the network load balancer to:
determine metering data from the application programming interface request;
batch the metering data from the application programming interface request with other metering data; and
transmit the metering data and the other metering data to a metering service to enable the metering service to determine billing information.

3. The computer-implemented method of claim 1, wherein the customer request to provision the network load balancer is generated based at least in part on a selection of a virtual machine image through an interface of a marketplace specifying one or more virtual machine images that can be used for provisioning of network load balancers.

4. The computer-implemented method of claim 1, further comprising:
  selecting the physical host system usable to instantiate the virtual machine image; and
  instantiating the identified virtual machine image onto the physical host system to provision the network load balancer.

5. A system, comprising:
one or more processors; and
memory including instructions that, when executed by the one or more processors, cause the system to:
  receive a customer request to configure a network load balancer to process requests to one or more computing resources associated with a customer, the customer request specifying one or more preferences usable to identify a virtual machine image to instantiate the network load balancer on to a physical host system;
  select, based at least in part on the one or more preferences, the virtual machine image; and
  fulfill the customer request at least by configuring the network load balancer to:
    receive an incoming request whose fulfillment involves access to the one or more computing resources associated with the customer;
    apply one or more request processing rules to the incoming request to determine whether the incoming request is to be transmitted to a computing resource of the one or more computing resources; and
    transmit the incoming request to the computing resource as a result of the incoming request satisfying the one or more request processing rules.

6. The system of claim 5, wherein the instructions further cause the system to:
  instantiate the virtual machine image on to the physical host system to enable configuration of the network load balancer for fulfillment of the customer request.

7. The system of claim 6, wherein the one or more preferences specified by the customer are provided through use of an interface of a marketplace for virtual machine images configured for use in instantiation of network load balancers.

8. The system of claim 5, wherein:
  the one or more request processing rules specify that the incoming request can be transmitted to the computing resource if the incoming request is authentic; and
  the network load balancer is further configured to:
    transmit the incoming request to a policy management service to determine whether the incoming request is authentic; and
    receive a notification from the policy management service specifying whether the incoming request is authentic such that:
      if the incoming request is authentic, transmit the incoming request to the computing resource; and
      if the incoming request is not authentic, deny the incoming request.

9. The system of claim 5, wherein:
  the one or more request processing rules specify that the incoming request can be transmitted to the computing resource if a user submitting the incoming request is authorized to perform one or more operations specified in the incoming request; and
  the network load balancer is further configured to:
    obtain one or more policies defining a level of access for the user to the one or more computing resources; and
    determine, based at least in part on the one or more policies, whether the user is authorized to perform the one or more operations specified in the incoming request such that:
      if the user is authorized to perform the one or more operations, transmit the incoming request to the computing resource; and
      if the user is not authorized to perform the one or more operations, deny the incoming request.

10. The system of claim 9, wherein the network load balancer is further configured to:
  identify the one or more policies;
  determine whether any of the one or more policies are stored within a policy cache; and
  transmit a request to a policy management service to obtain any of the one or more policies that are not stored within the policy cache.

11. The system of claim 5, wherein the request processing rules specify that incoming requests from users associated with an account of the customer satisfy the request processing rules.

12. The system of claim 5, wherein the network load balancer is further configured to:
  determine metering data from the incoming request;
  aggregate the metering data from the incoming request with other metering data to generate aggregated metering data; and
  provide the aggregated metering data to the customer.

13. A non-transitory computer-readable storage medium having stored thereon executable instructions that, as a result of being executed by one or more processors of a computer system, cause the computer system to at least:
  receive a customer request to configure a network load balancer for distributing requests to one or more computing resources of a customer, the customer request specifying configuration information that defines a set of request processing rules and one or more preferences usable to select a virtual machine image to instantiate the network load balancer;
  obtain, from a repository of virtual machine images, based at least in part on the one or more preferences, the virtual machine image to instantiate the network load balancer onto a physical host; and
  configure the network load balancer according to the configuration information, causing the network load balancer to:
    receive an incoming request whose fulfillment involves access to computing resource of the one or more computing resources of the customer;
    apply the set of request processing rules to the incoming request to determine whether the incoming request is to be transmitted to a computing resource of the one or more computing resources; and
    transmit the incoming request to a computing resource of the one or more computing resources as a result of the incoming request having satisfied the set of request processing rules.

14. The non-transitory computer-readable storage medium of claim 13, wherein the instructions further cause the computer system to:
  select, from a plurality of physical hosts, the physical host; and
  instantiate the virtual machine image onto the physical host to activate the network load balancer.

15. The non-transitory computer-readable storage medium of claim 14, wherein the one or more preferences were defined by the customer through a marketplace for virtual machine images configured for use in instantiation of network load balancers.

16. The non-transitory computer-readable storage medium of claim 13, wherein:
the set of request processing rules are satisfied if the incoming request is authentic; and
the network load balancer is further configured to:
obtain a digital signature from the incoming request;
verify the digital signature; and
determine that the incoming request is authentic as a result of the digital signature being verified.

17. The non-transitory computer-readable storage medium of claim 13, wherein:
the set of request processing rules are satisfied if a user submitting the incoming request is authorized to perform one or more operations specified in the incoming request; and
the network load balancer is further configured to:
obtain one or more policies defining a level of access for the user to the one or more computing resources; and
determine that the user is authorized to perform the one or more operations based at least in part on the one or more policies.

18. The non-transitory computer-readable storage medium of claim 17, wherein the network load balancer is further configured to transmit a request to a policy management service to obtain the one or more policies.

19. The non-transitory computer-readable storage medium of claim 13, wherein the network load balancer is further configured to:
determine metering data from the incoming request for a user; and
transmit the metering data to a metering service to enable the metering service to determine billing information for the user.

20. The non-transitory computer-readable storage medium of claim 13, wherein the set of request processing rules specify that any incoming requests from users not associated with an account of the customer are to be authenticated and subject to a determination as to whether the users are authorized to perform operations specified in the incoming requests prior to transmittal of the incoming requests to the one or more computing resources.

* * * * *